(12) United States Patent
Gondo et al.

(10) Patent No.: US 12,273,049 B2
(45) Date of Patent: Apr. 8, 2025

(54) POWER CONVERSION DEVICE

(71) Applicant: YAZAKI CORPORATION, Tokyo (JP)

(72) Inventors: Ryo Gondo, Susono (JP); Akinori Maruyama, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 316 days.

(21) Appl. No.: 18/172,304

(22) Filed: Feb. 21, 2023

(65) Prior Publication Data

US 2023/0291329 A1 Sep. 14, 2023

(30) Foreign Application Priority Data

Mar. 10, 2022 (JP) .................................. 2022-036729

(51) Int. Cl.
*H02M 7/5387* (2007.01)
*H02M 1/42* (2007.01)

(52) U.S. Cl.
CPC ..... *H02M 7/53871* (2013.01); *H02M 1/4233* (2013.01)

(58) Field of Classification Search
CPC ......... H02M 7/53871; H02M 7/53873; H02M 7/53875; H02M 7/53876; H02M 7/53878; H02M 7/5388; H02M 7/5387; H02M 1/4233; H02M 1/425; H02M 1/4258; H02M 1/12
See application file for complete search history.

(56) References Cited

U.S. PATENT DOCUMENTS

| | | | |
|---|---|---|---|
| 2016/0211749 A1* | 7/2016 | Okada | H02M 3/158 |
| 2017/0244317 A1* | 8/2017 | Kondo | H02M 7/12 |
| 2018/0287390 A1* | 10/2018 | Nakajima | H02J 7/35 |

FOREIGN PATENT DOCUMENTS

JP    2018-125915 A    8/2018

* cited by examiner

*Primary Examiner* — Nguyen Tran

(74) *Attorney, Agent, or Firm* — KENEALY VAIDYA LLP

(57) ABSTRACT

A power conversion device includes an AC current sensor, an AC voltage sensor, a DC voltage sensor, and a control circuit. The control circuit includes an integration unit configured to integrate a difference between a predetermined overcurrent threshold and the output current detected by the AC current sensor and output an integration output, a multiplication unit configured to multiply the integration output outputted from the integration unit by the output voltage detected by the AC voltage sensor and output a multiplication output, a division unit configured to calculate and output a Duty ratio by dividing the multiplication output outputted from the multiplication unit by the DC voltage detected by the DC voltage sensor, and a voltage control unit configured to control the AC voltage according to the Duty ratio outputted from the division unit.

3 Claims, 3 Drawing Sheets

POWER CONVERSION DEVICE

CROSS-REFERENCE TO RELATED APPLICATIONS

This application is based on and claims priority under 35 USC 119 from Japanese Patent Application No. 2022-036729 filed on Mar. 10, 2022, the contents of which are incorporated herein by reference.

TECHNICAL FIELD

The present invention relates to a power conversion device.

BACKGROUND ART

As an in-vehicle inverter, there is known an inverter that includes a current limiter for protecting a semiconductor switching element from an overcurrent, and performs a control to broaden a limiter value of the current limiter only for a predetermined period from a time when a load is connected to an AC output of the inverter (for example, see Patent Literature 1). In this inverter, a load connection detection circuit detects a temporary drop in output voltage of the inverter or a temporary increase in various currents that occurs when a load is connected to the AC output of the inverter, and the limiter value of the current limiter is broaden only for a short time of about one second. Accordingly, it is intended to supply a current required for activation of the load connected to the AC output of the inverter and to protect the switching element of the inverter from an overcurrent.

CITATION LIST

Patent Literature

Patent Literature 1: JP2018-125915A

SUMMARY OF INVENTION

In the inverter described in Patent Literature 1, after a temporary change in output voltage or various currents of the inverter is detected, an operation of broadening the limiter value is terminated in a short time during which a temperature threshold of the switching element is not exceeded. Therefore, it is necessary to extremely shorten a time delay until a temporary change in output voltage or the like of the inverter is detected, and it is necessary to provide an expensive microcomputer having a high clock frequency in the load connection detection circuit. That is, in the inverter described in Patent Literature 1, in addition to a matter that providing the load connection detection circuit itself causes an increase in size and an increase in cost, there is a problem that providing the expensive microcomputer further increases the cost.

In view of the above circumstances, an object of the present invention is to provide a power conversion device capable of dealing with activation of a load connected to an AC output of an inverter circuit, and capable of achieving reductions in size and cost.

A power conversion device of the present invention includes an inverter circuit configured to convert a DC voltage into an AC voltage and output the AC voltage to a load; an AC current sensor configured to detect an AC current outputted from the inverter circuit; an AC voltage sensor configured to detect the AC voltage outputted from the inverter circuit; a DC voltage sensor configured to detect the DC voltage input to the inverter circuit; and a control circuit configured to control the AC voltage based on the AC current detected by the AC current sensor, the AC voltage detected by the AC voltage sensor, and the DC voltage detected by the DC voltage sensor. The control circuit includes an integration unit configured to integrate a difference between a predetermined overcurrent threshold and the AC current detected by the AC current sensor and output an integration output, a multiplication unit configured to multiply the integration output outputted from the integration unit by the AC voltage detected by the AC voltage sensor and output a multiplication output, a division unit configured to calculate and output a Duty ratio by dividing the multiplication output outputted from the multiplication unit by the DC voltage detected by the DC voltage sensor, and a voltage control unit configured to control the AC voltage according to the Duty ratio outputted from the division unit.

According to the present invention, it is possible to cope with activation of a load connected to an AC output of an inverter circuit, and to achieve reductions in size and cost.

BRIEF DESCRIPTION OF DRAWINGS

Exemplary embodiment(s) of the present invention will be described in detail based on the following figures, wherein.

DESCRIPTION OF EMBODIMENTS

The present invention will be described below in accordance with a preferred embodiment. Also, it should be noted that the present invention is not limited to the embodiment shown below, and can be appropriately modified without departing from the gist of the present invention. In addition, in the embodiment shown below, illustration and description of some configurations are omitted, but regarding details of the omitted techniques, publicly known or well-known techniques are appropriately applied as long as there is no contradiction with the contents described below.

Figure 1:
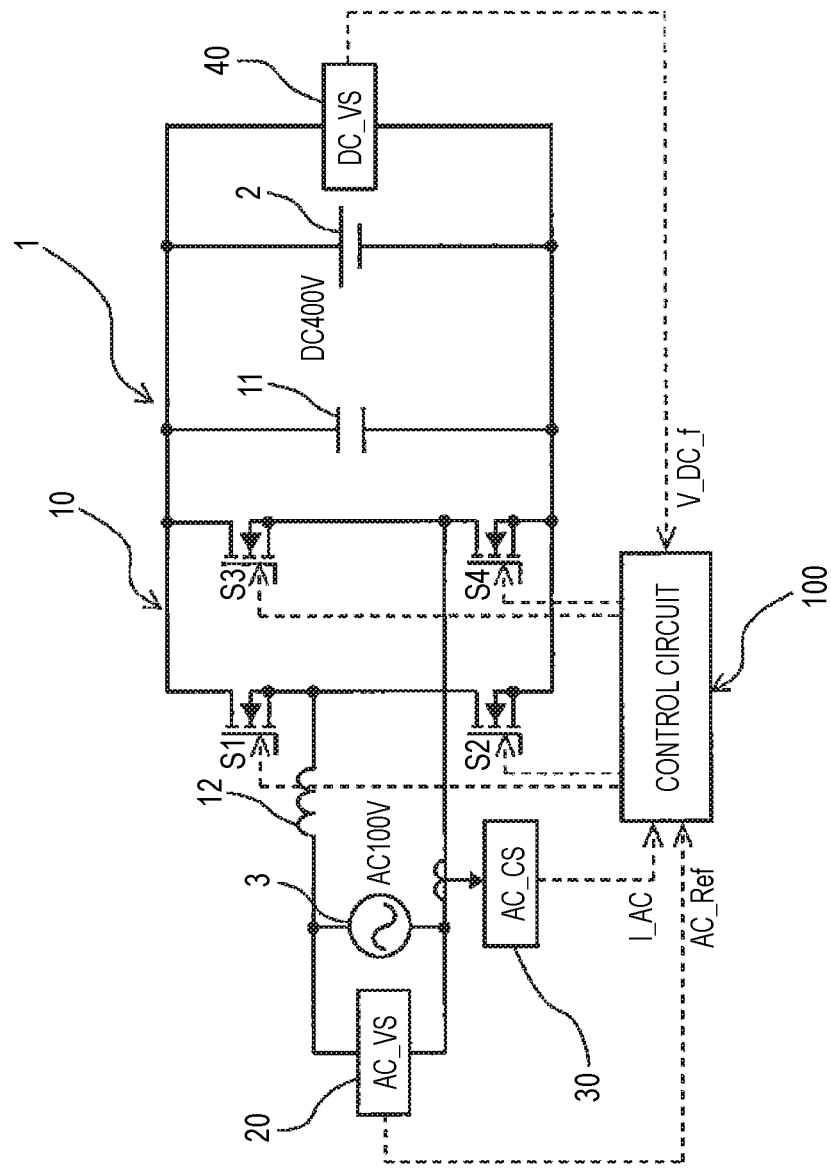
FIG. 1 is a circuit diagram showing a power conversion device according to an embodiment of the present invention.

FIG. 1 is a circuit diagram showing a power conversion device 1 according to an embodiment of the present invention. The power conversion device 1 shown in this circuit diagram has a function of a DC/AC converter, and converts a DC voltage outputted from a battery 2 into an AC voltage and outputs the AC voltage to a load 3. For example, the power conversion device 1 converts a DC voltage outputted from the battery 2 of DC 400 V into an AC voltage of AC 100 V. It should be noted that it is also possible to provide the power conversion device 1 in an in-vehicle charger. In this case, by using the power conversion device 1 as a bidirectional AC/DC converter, it is possible to convert an AC voltage input from a system power supply (not shown) into a DC voltage to charge the battery 2, and convert a DC voltage outputted from the battery 2 into an AC voltage and output the AC voltage to the load 3.

The power conversion device 1 includes an inverter circuit 10, a voltage sensor 20 for an output voltage AC_Ref, a current sensor 30 for an output current I_AC, a voltage sensor 40 for a DC link voltage V_DC_f, and a control circuit 100. The inverter circuit 10 is a voltage-type full-bridge power factor correction (PFC) inverter, and includes semiconductor switching elements S1 to S4, a capacitor 11, and an inductor 12. It should be noted that the voltage-type full-bridge PFC inverter is an example, and a configuration of the inverter circuit 10 may be a configuration of another inverter circuit such as a current-type half-bridge inverter. When the inverter circuit 10 is not a bidirectional AC/DC converter, it is not essential that the inverter circuit 10 is a PFC circuit, and it is not essential that the inverter circuit 10 includes the inductor 12.

Examples of the semiconductor switching elements S1 to S4 include a field effect transistor (FET) and an insulated gate bipolar transistor (IGBT). ON/OFF control of each of the semiconductor switching elements S1 to S4 is performed according to a pulse width modulation (PWM) signal outputted from the control circuit 100.

Here, the output voltage AC_Ref is determined by a Duty ratio, which is an ON/OFF time ratio of each of the semiconductor switching elements S1 to S4. Although details will be described later, the control circuit 100 calculates this Duty ratio and generates a PWM signal according to the calculated Duty ratio.

Here, the inductor 12 and the semiconductor switching elements S1 to S4 may be thermally destroyed by an overcurrent. Therefore, although details will be described later, the control circuit 100 calculates the Duty ratio based on an overcurrent threshold AC_Limit, which is an upper limit value of the output current I_AC.

The voltage sensor 20 detects the output voltage AC_Ref of the inverter circuit 10 and outputs the output voltage AC_Ref to the control circuit 100. In addition, the current sensor 30 detects the output current I_AC of the inverter circuit 10 and outputs the output current I_AC to the control circuit 100. Further, the voltage sensor 40 detects the voltage (DC link voltage) V_DC_f of the capacitor 11 and outputs the voltage (DC link voltage) V_DC_f to the control circuit 100.

Figure 2:
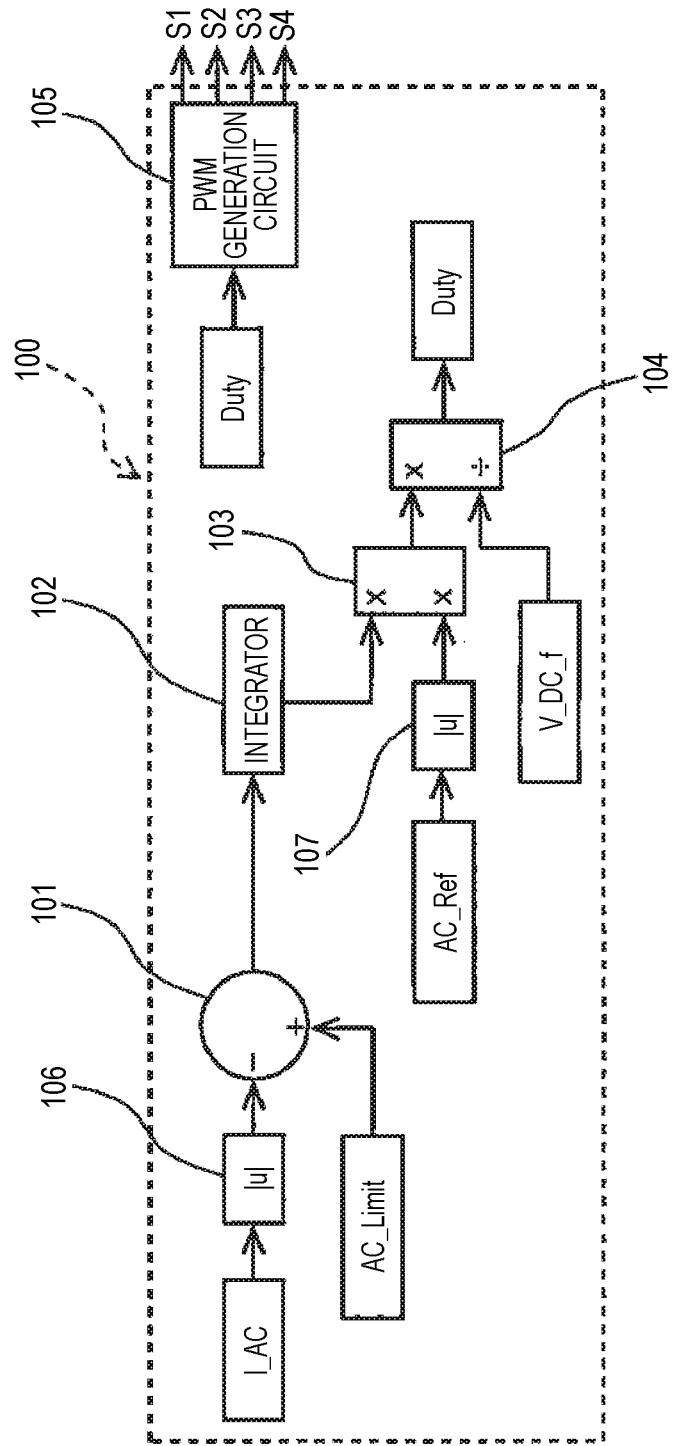
FIG. 2 is a circuit diagram showing a control circuit shown in FIG. 1.

FIG. 2 is a circuit diagram showing the control circuit 100 shown in FIG. 1. As shown in this figure, the control circuit 100 calculates the Duty ratio of each of the semiconductor switching elements S1 to S4 based on a difference between the overcurrent threshold AC_Limit and an absolute value of the output current I_AC outputted from the current sensor 30 (see FIG. 1).

The control circuit 100 includes a comparator 101, an integrator 102, a multiplier 103, a divider 104, and a PWM generation circuit 105. Further, the control circuit 100 includes absolute value circuits 106 and 107. The output current I_AC outputted from the current sensor 30 (see FIG. 1) is input to the absolute value circuit 106, and in the absolute value circuit 106, the absolute value of the output current I_AC is calculated. The absolute value of the output current I_AC is input from the absolute value circuit 106 to the comparator 101. In addition, the overcurrent threshold AC_Limit is input from a memory (not shown) to the comparator 101.

The comparator 101 calculates a difference between the overcurrent threshold AC_Limit and the absolute value of the output current I_AC, and outputs the difference to the integrator 102. When the absolute value of the output current I_AC is smaller than the overcurrent threshold AC_Limit, the comparator 101 outputs a positive value. On the other hand, when the absolute value of the output current I_AC is larger than the overcurrent threshold AC_Limit, the comparator 101 outputs a negative value.

The integrator 102 integrates the output value of the comparator 101 and outputs the result to the multiplier 103. Here, the minimum value of the integration output of the integrator 102 is 0 (0%), and the maximum value of the integration output of the integrator 102 is 1 (100%). When the absolute value of the output current I_AC is smaller than the overcurrent threshold AC_Limit and the comparator 101 outputs a positive value, the integration output of the integrator 102 converges to the maximum value of 1 (100%). On the other hand, when the absolute value of the output current I_AC is larger than the overcurrent threshold AC_Limit and the comparator 101 outputs a negative value, the integration output of the integrator 102 fluctuates toward the minimum value of 0 (0%).

The output voltage AC_Ref outputted from the voltage sensor 20 (see FIG. 1) is input to the absolute value circuit 107, and in the absolute value circuit 107, an absolute value of the output voltage AC_Ref is calculated. The absolute value of the output voltage AC_Ref is outputted from the absolute value circuit 107 to the multiplier 103. The multiplier 103 multiplies an output of the integrator 102 by the absolute value of the output voltage AC_Ref and outputs the result to the divider 104.

The DC link voltage V_DC_f outputted from the voltage sensor 40 is input to the divider 104. The divider 104 calculates the Duty ratio by dividing a product of the integration output of the integrator 102 and the absolute value of the output voltage AC_Ref by the DC link voltage V_DC_f, and outputs the calculated Duty ratio to the PWM generation circuit 105.

The PWM generation circuit 105 generates a PWM signal for turning ON/OFF each of the semiconductor switching elements S1 to S4 at the Duty ratio outputted from the divider 104. Here, a magnitude of the output voltage AC_Ref is determined according to the Duty ratio. For example, when the Duty ratio is the maximum value of 1 (100%), the output voltage AC_Ref and the DC link voltage V_DC_f match. On the other hand, as the Duty ratio approaches 0 (0%), the output voltage AC_Ref is decreased.

Figure 3:
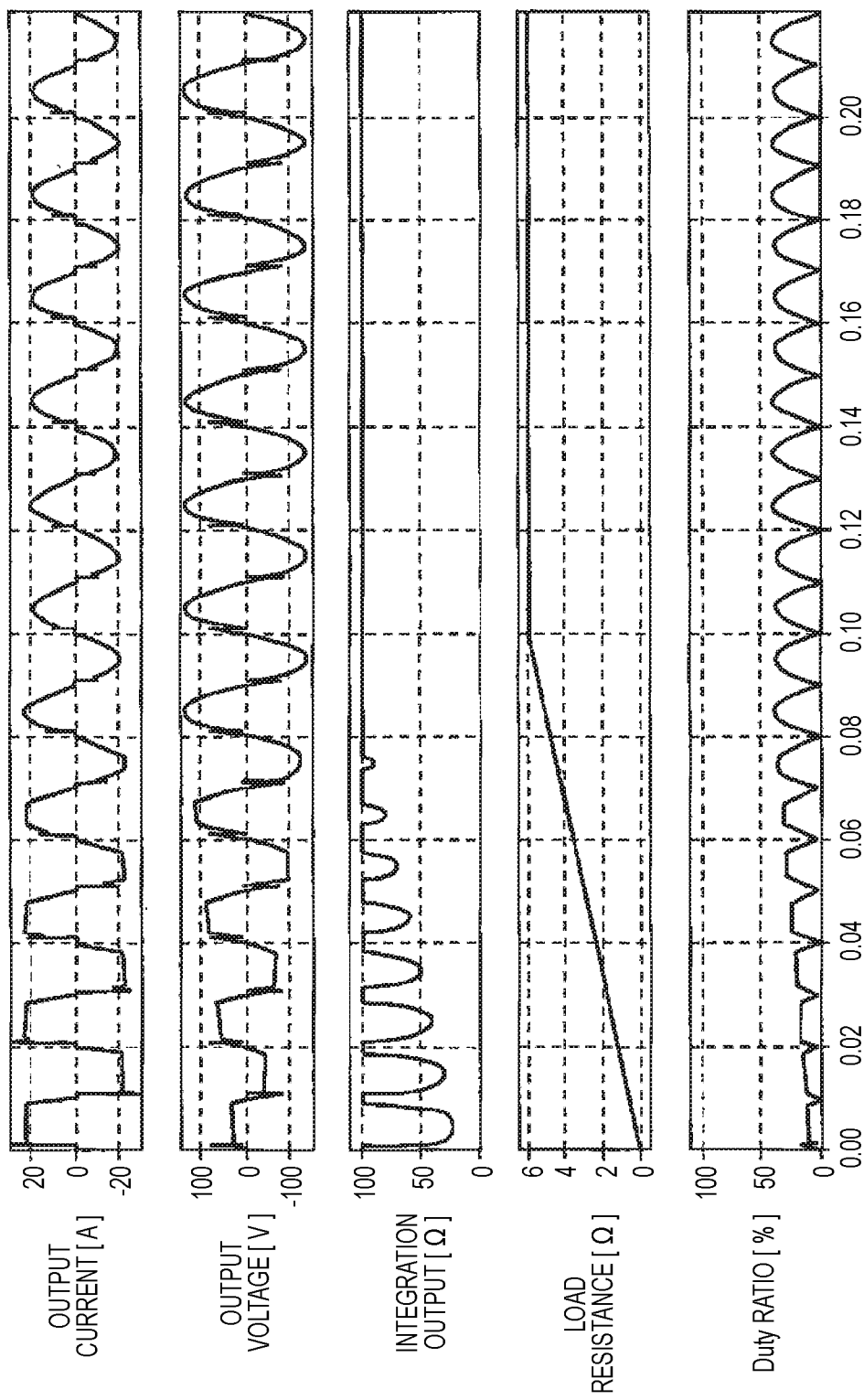
FIG. 3 is a waveform diagram showing relationships of an output current, an output voltage, an integration output of an integrator, a resistance of the load, and a Duty ratio when a load is activated.

FIG. 3 is a waveform diagram showing relationships of the output current I_AC, the output voltage AC_Ref, the integration output of the integrator 102, a resistance of the load 3, and the Duty ratio when the load 3 is activated. As shown in this waveform diagram, when the load 3 is activated, the resistance of the load 3 is progressively increased from the minimum value to the maximum value. Then, after the load 3 is activated (after the resistance is increased to the maximum value), the resistance of the load 3 converges to the maximum value. It is assumed that in the load 3, an activation current of a motor or the like is large, and thus overcurrent protection of the inverter circuit 10 is required when the load 3 is activated. It should be noted that the waveform diagram shown in FIG. 3 does not represent an activation current waveform of a motor or the like, but simulates an activation current waveform of a motor or the like as an example of a waveform in which an activation current is large.

Here, it is also assumed that since the resistance of the load 3 when the load 3 is activated is small as compared with that after the load 3 is activated, when voltage control of restricting the output voltage AC_Ref is not performed, the output current I_AC is increased and exceeds the overcurrent threshold AC_Limit. In contrast, in the present embodiment, when the load 3 is activated, if the output current I_AC exceeds the overcurrent threshold AC_Limit, the integration output of the integrator 102 fluctuates from the maximum value of 1 (100%) to the minimum value of 0 (0%). Accordingly, when the load 3 is activated, the Duty ratio outputted from the divider 104 is restricted to be small as compared with that when the integration output of the integrator 102 is the maximum value of 1 (100%). Therefore, by restricting the output voltage AC_Ref when the load 3 is activated as compared with that after the load 3 is activated, it is possible to restrict the output current I_AC when the load 3 is activated to the same magnitude as that after the load 3 is activated, and to achieve the overcurrent protection of the inverter circuit 10 when the load 3 is activated.

Then, as the resistance of the load 3 is progressively increased, the integration output of the integrator 102 gradually converges to the maximum value of 1 (100%), and the Duty ratio outputted from the divider 104 is increased to a predetermined value (for example, 30% to 50%). Here, the output voltage AC_Ref determined by the Duty ratio of the predetermined value is a value that allows the output current I_AC to be maintained at or below the overcurrent threshold AC_Limit.

As described above, in the power conversion device 1 according to the present embodiment, the control circuit 100 controls the output voltage AC_Ref based on the output current I_AC, the output voltage AC_Ref, and the DC link voltage V_DC_f. Accordingly, it is possible to activate the load 3 such as a motor connected to an AC output of the inverter circuit 10 while the overcurrent protection of the inverter circuit 10 can be achieved.

Specifically, in the control circuit 100, the integrator 102 integrates a difference between the overcurrent threshold AC_Limit and the output current I_AC and outputs an integration output, and the multiplier 103 multiplies the integration output of the integrator 102 by the output voltage AC_Ref and outputs a multiplication output. Here, when the load 3 such as a motor is activated, the integration output of the integrator 102 fluctuates from the maximum value of 1 (100%) to the minimum value of 0 (0%), so that the multiplication output of the multiplier 103 is reduced as compared with that after the load 3 is activated.

Then, the divider 104 calculates and outputs the Duty ratio by dividing the multiplication output of the multiplier 103 by the DC link voltage V_DC_f Here, when the load 3 such as a motor is activated, the Duty ratio is restricted to be small as compared with that after the load 3 is activated.

Then, the PWM generation circuit 105 controls the output voltage AC_Ref according to the Duty ratio outputted from the divider 104. Here, when the load 3 such as a motor is activated, the output voltage AC_Ref is restricted to be small as compared with that after the load 3 is activated.

As described above, when the load 3 such as a motor is activated, the activation current can be supplied to the load 3 while the output current I_AC can be restricted to the same magnitude as that after the load 3 is activated. That is, it is possible to activate the load 3 such as a motor connected to the AC output of the inverter circuit 10 while the overcurrent protection of the inverter circuit 10 can be achieved.

Here, in the power conversion device 1 according to the present embodiment, it is possible to activate the load 3 such as a motor connected to the AC output of the inverter circuit 10 while the overcurrent protection of the inverter circuit 10 can be achieved without requiring a load connection detection circuit that detects the connection of the load 3. Therefore, according to the power conversion device 1 of the present embodiment, it is possible to achieve reductions in cost and size as compared with a power conversion device that requires a load connection detection circuit.

In addition, in the power conversion device 1 of the present embodiment, it is possible to activate the load 3 such as a motor connected to the AC output of the inverter circuit 10 while the overcurrent protection of the inverter circuit 10 can be achieved without changing the overcurrent threshold AC_Limit between when the load 3 is activated and after the load 3 is activated. Therefore, by increasing the overcurrent threshold AC_Limit when the load 3 is activated, a reduction in cost can be achieve as compared with a power conversion device that requires an expensive microcomputer having a high clock frequency. In addition, by increasing the overcurrent threshold AC_Limit when the load 3 is activated, an effect is exerted that a wide load 3 can be activated regardless of restrictions of temperature conditions, as compared with a power conversion device that has difficulty in coping with activation of a motor or the like in a high-temperature environment.

Further, according to the power conversion device 1 of the present embodiment, in the control circuit 100, the absolute value circuit 106 calculates and outputs the absolute value of the output current I_AC, and the comparator 101 calculates the difference between the overcurrent threshold AC_Limit and the absolute value of the output current I_AC and outputs the difference to the integrator 102. Then, the integrator 102 integrates the difference between the overcurrent threshold AC_Limit and the absolute value of the output current I_AC and outputs the integration output. Accordingly, in a case that the absolute value of the output current I_AC exceeds the overcurrent threshold AC_Limit, the integration output fluctuates from the maximum value of 1 (100%) to the minimum value of 0 (0%). On the other hand, in case that the absolute value of the output current I_AC does not exceed the overcurrent threshold AC_Limit, the integration output converges to the maximum value of 1 (100%).

In addition, in the power conversion device 1 of the present embodiment, in the control circuit 100, the absolute value circuit 107 calculates and outputs the absolute value of the output voltage AC_Ref, and the multiplier 103 multiplies the integration output outputted from the integrator 102 by the absolute value of the output voltage AC_Ref, and outputs the multiplication output. Accordingly, it is possible to calculate the Duty ratio in the divider 104.

Although the present invention has been described above based on the embodiment, the present invention is not limited to the above embodiment, and modifications may be made without departing from the gist of the present invention and publicly known or well-known techniques may be appropriately combined.

What is claimed is:
1. A power conversion device comprising:
an inverter circuit configured to convert a DC voltage into an AC voltage and output the AC voltage to a load;
an AC current sensor configured to detect an AC current outputted from the inverter circuit;
an AC voltage sensor configured to detect the AC voltage outputted from the inverter circuit;
a DC voltage sensor configured to detect the DC voltage input to the inverter circuit; and
a control circuit configured to control the AC voltage based on the AC current detected by the AC current sensor, the AC voltage detected by the AC voltage sensor, and the DC voltage detected by the DC voltage sensor, wherein the control circuit includes
an integration unit configured to integrate a difference between a predetermined overcurrent threshold and the AC current detected by the AC current sensor and output an integration output,
a multiplication unit configured to multiply the integration output outputted from the integration unit by the AC voltage detected by the AC voltage sensor and output a multiplication output,
a division unit configured to calculate and output a duty ratio by dividing the multiplication output outputted from the multiplication unit by the DC voltage detected by the DC voltage sensor, and
a voltage control unit configured to control the AC voltage according to the duty ratio outputted from the division unit.

2. The power conversion device according to claim 1, wherein
the control circuit further includes
a first absolute value circuit configured to calculate and output an absolute value of the AC current detected by the AC current sensor, and
a comparator configured to calculate a difference between the predetermined overcurrent threshold and the absolute value of the AC current outputted from the first absolute value circuit and output the difference to the integration unit, and
the integration unit integrates the difference between the predetermined overcurrent threshold and the absolute value of the AC current outputted from the comparator and outputs the integration output.

3. The power conversion device according to claim 2, wherein
the control circuit further includes
a second absolute value circuit configured to calculate and output an absolute value of the AC voltage detected by the AC voltage sensor, and
the multiplication unit multiplies the integration output outputted from the integration unit by the absolute value of the AC voltage outputted from the second absolute value circuit, and outputs the multiplication output.

* * * * *